(12) United States Patent
Cocks et al.

(10) Patent No.: US 9,716,420 B2
(45) Date of Patent: Jul. 25, 2017

(54) FAN AND ELECTRIC MACHINE ASSEMBLY AND METHODS THEREFOR

(71) Applicant: Regal Beloit America, Inc., Beloit, WI (US)

(72) Inventors: Rachele B. Cocks, Columbia City, IN (US); Barry M. Benson, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 639 days.

(21) Appl. No.: 14/011,853

(22) Filed: Aug. 28, 2013

(65) Prior Publication Data

US 2014/0062232 A1 Mar. 6, 2014

Related U.S. Application Data

(60) Provisional application No. 61/694,061, filed on Aug. 28, 2012.

(51) Int. Cl.
| | | |
|---|---|---|
| *H02K 9/06* | (2006.01) | |
| *F04D 25/08* | (2006.01) | |
| *F04D 17/06* | (2006.01) | |
| *F04D 29/28* | (2006.01) | |
| *H02K 9/14* | (2006.01) | |

(52) U.S. Cl.
CPC ............... *H02K 9/06* (2013.01); *F04D 17/06* (2013.01); *F04D 25/082* (2013.01); *F04D 29/281* (2013.01); *H02K 9/14* (2013.01); *Y10T 29/49336* (2015.01)

(58) Field of Classification Search
CPC ......... H02K 9/06; F04D 25/082; F04D 29/30; F04D 29/281
See application file for complete search history.

(56) References Cited

U.S. PATENT DOCUMENTS

| | | | |
|---|---|---|---|
| 4,670,677 A | 6/1987 | Snider et al. | |
| 4,684,835 A | 8/1987 | Kline, Jr. et al. | |
| 5,476,366 A | 12/1995 | Weihsmann | |
| 5,763,969 A * | 6/1998 | Metheny | H02K 11/33 310/52 |
| 6,294,852 B1 | 9/2001 | Lee | |
| 6,439,843 B1 | 8/2002 | Finkenbinder | |
| 6,514,052 B2 * | 2/2003 | Bostwick | F04D 17/105 416/189 |
| 6,522,036 B1 | 2/2003 | Chen | |
| 6,744,157 B2 * | 6/2004 | Choi | H02K 1/165 310/180 |
| 6,955,530 B2 | 10/2005 | Ciccarelli, Jr. et al. | |
| 7,122,924 B2 * | 10/2006 | Lee | H02K 9/06 310/58 |
| 7,495,362 B2 * | 2/2009 | Tung | F04D 29/329 310/156.26 |
| 7,567,003 B2 | 7/2009 | Hong et al. | |

(Continued)

*Primary Examiner* — Dang Le
(74) *Attorney, Agent, or Firm* — Armstrong Teasdale LLP

(57) ABSTRACT

In one embodiment, a fan for a rotating device having a shaft with an axis of rotation is provided. The fan includes a base plate having a front surface, a rear surface, and a hub configured for coupling to the shaft. The fan further includes at least one blade projecting from the front surface of the base plate substantially perpendicular to the base plate. The base plate is contoured to direct air at an acute angle relative to the axis of rotation.

17 Claims, 5 Drawing Sheets

(56) References Cited

U.S. PATENT DOCUMENTS

| | | | |
|---|---|---|---|
| 7,589,444 B2 | 9/2009 | Teshima et al. | |
| 7,600,975 B2 * | 10/2009 | Lotrionte | F03B 3/04 |
| | | | 416/223 R |
| 7,615,897 B2 | 11/2009 | Kinoshita | |
| 7,832,981 B2 | 11/2010 | Hasan et al. | |
| 8,007,241 B2 * | 8/2011 | Vadillo | F04D 29/281 |
| | | | 416/203 |
| 2010/0213775 A1 * | 8/2010 | Naghshineh | H02K 3/527 |
| | | | 310/62 |

* cited by examiner

FAN AND ELECTRIC MACHINE ASSEMBLY AND METHODS THEREFOR

CROSS REFERENCE TO RELATED APPLICATION

This application is a non-provisional application and claims priority to U.S. Provisional Patent Application Ser. No. 61/694,061 filed Aug. 28, 2012 for "FAN AND MOTOR ASSEMBLY AND METHODS THEREFOR", which is hereby incorporated by reference in its entirety.

BACKGROUND

The field of the invention relates generally to fans and, more particularly, to cooling fans for motor assemblies.

Many known electric machines such as electric motors generate heat during operation. At least some known motors are provided with a cooling fan rotatably coupled thereto, and the fan rotates during operation of the motor to produce air flow over the motor housing to facilitate cooling the motor. However, these fans direct airflow in a manner that produces a less than optimal motor cooling effect.

BRIEF DESCRIPTION

In one embodiment, a fan for a rotating device having a shaft with an axis of rotation is provided. The fan includes a base plate having a front surface, a rear surface, and a hub configured for coupling to the shaft. The fan further includes at least one blade projecting from the front surface of the base plate substantially perpendicular to the base plate. The base plate is contoured to direct air at an acute angle relative to the axis of rotation.

In another embodiment, an electric machine assembly is provided. The electric machine assembly includes a motor including a housing and a shaft with an axis of rotation. The electric machine assembly further includes a fan including a base plate having a front surface, a rear surface, and a hub configured for coupling to the shaft. The fan further includes a plurality of blades projecting from the front surface of the base plate substantially perpendicular to the base plate. The base plate is contoured to direct air at an acute angle relative to the axis of rotation.

In yet another embodiment, a method of assembling an electric machine assembly is described. The method includes providing a motor including a housing and a shaft with an axis of rotation and coupling a fan to the shaft. The fan includes a base plate comprising a front surface, a rear surface, an outer rim, and a hub configured for coupling to the shaft. The fan further includes at least one blade projecting from the front surface of the base plate substantially perpendicular to the base plate. The base plate is contoured to direct air at an acute angle relative to the axis of rotation.

DETAILED DESCRIPTION

Figure 1:
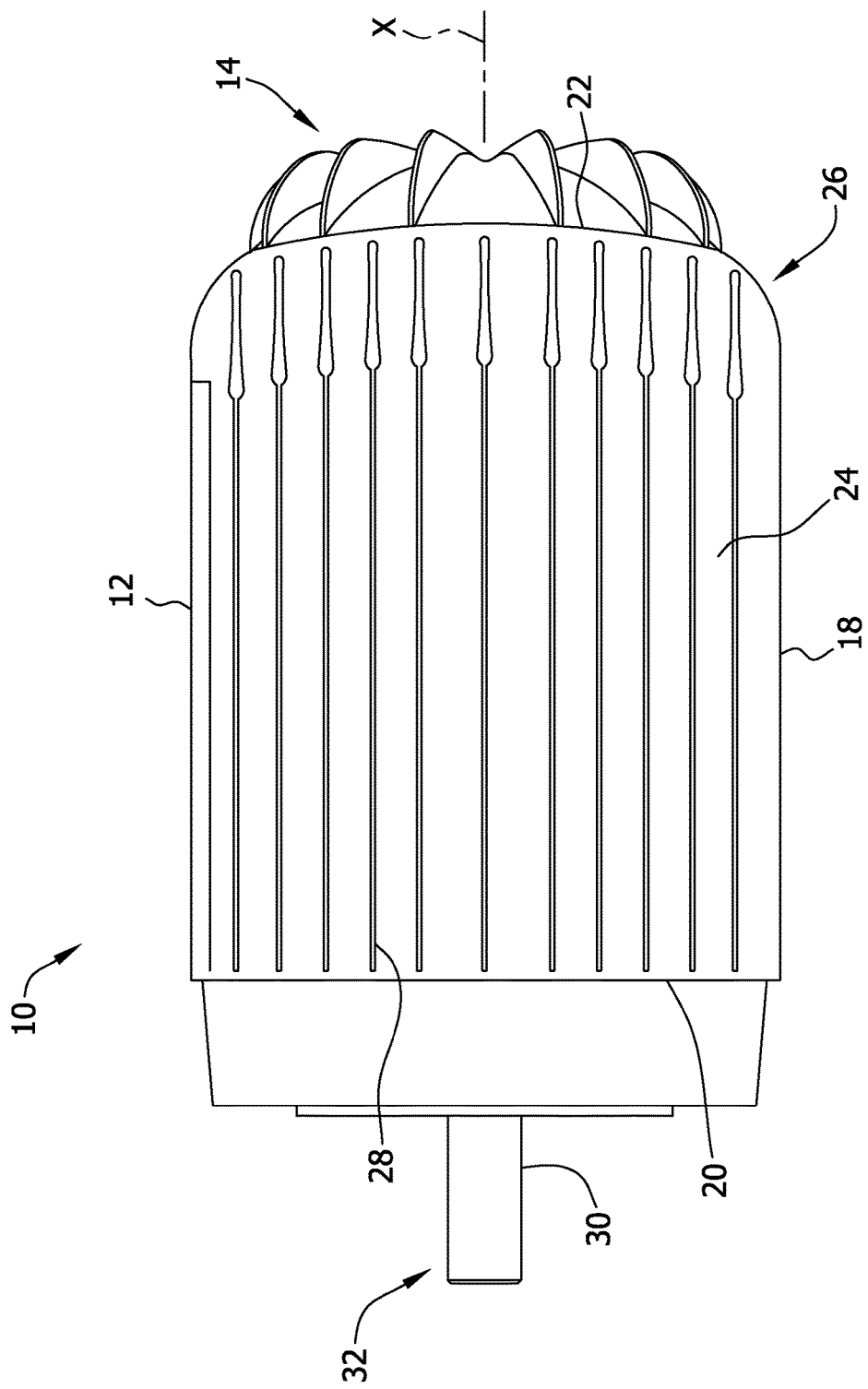
FIG. 1 is a side view of an exemplary electric machine assembly.

FIG. 1 illustrates an exemplary embodiment of an electric machine assembly 10 including a motor 12 and a fan 14. Motor 12 includes a housing 18 having a first end wall 20, a second end wall 22, and a sidewall 24 extending from first end wall 20 to second end wall 22. In one embodiment, housing 18 is generally cylindrical. In other embodiments, housing 18 may be any suitable shape that enables fan 14 to function as described herein. In the exemplary embodiment, second end wall 22 and sidewall 24 are joined together at a rounded contour 26 having a continuously changing degree of curvature (e.g., a substantially elliptical contour). A plurality of cooling fins 28 project from sidewall 24 and are oriented along a length of housing 18 substantially from first end wall 20 to second end wall 22. In an alternative embodiment, cooling fins 28 may extend along only a portion of housing 18 or may not be present at all.

In the exemplary embodiment, motor 12 has a rotating shaft 30. Shaft 30 has a first end 32, a second end 34 (FIG. 5), and an axis of rotation X oriented from first end 32 to second end 34. Shaft 30 extends through first end wall 20 of housing 18 such that first end 32 of shaft 30 is exposed outside of housing 18 for coupling to a load (not shown). Shaft 30 also extends through second end wall 22 such that second end 34 of shaft 30 is exposed outside of housing 18 for coupling to fan 14 to facilitate producing a flow of cooling air over housing 18 for cooling motor 12, as described below.

Figure 2:
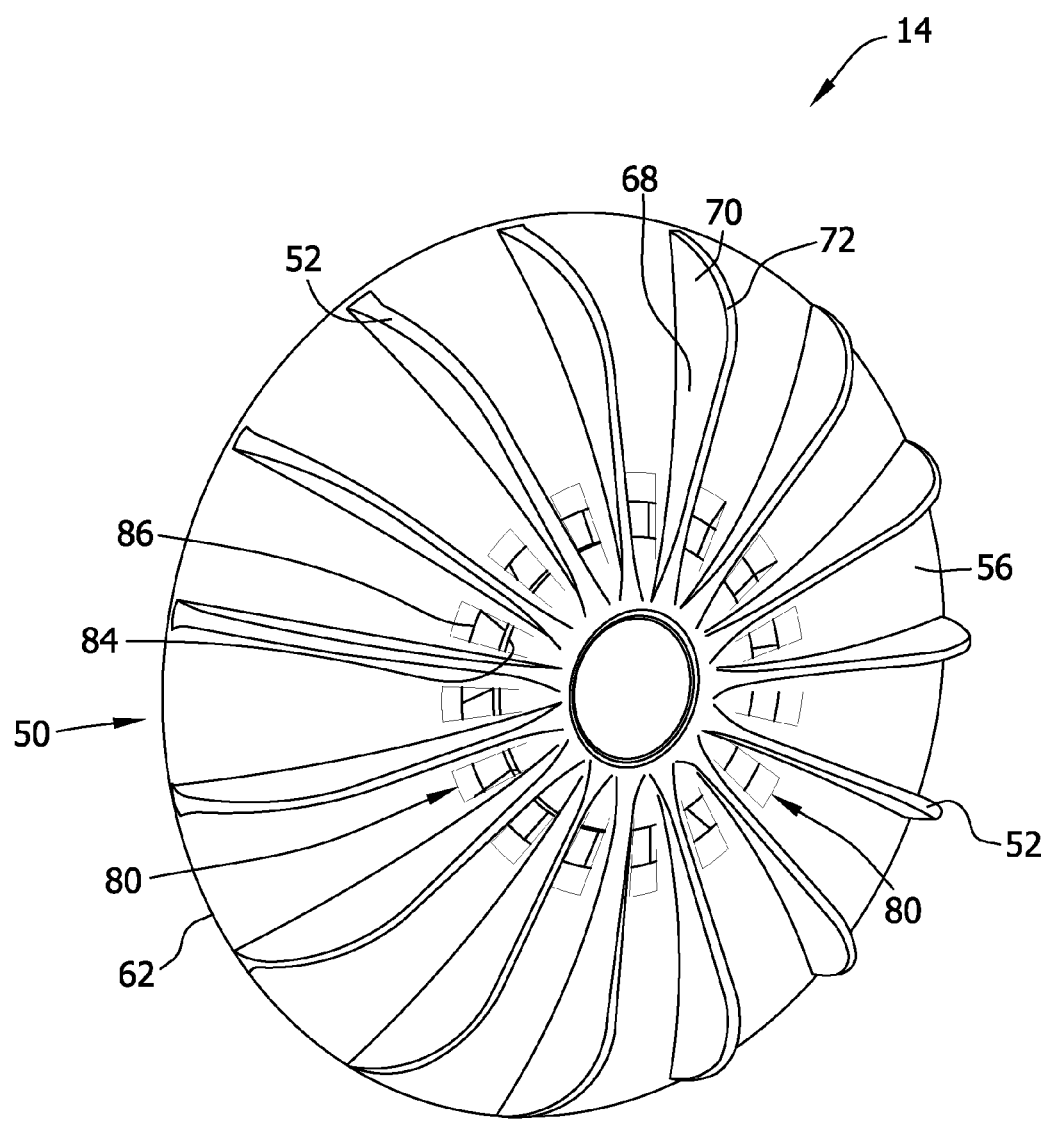
FIG. 2 is a perspective view of a fan of the electric machine assembly shown in FIG. 1.
Figure 3:
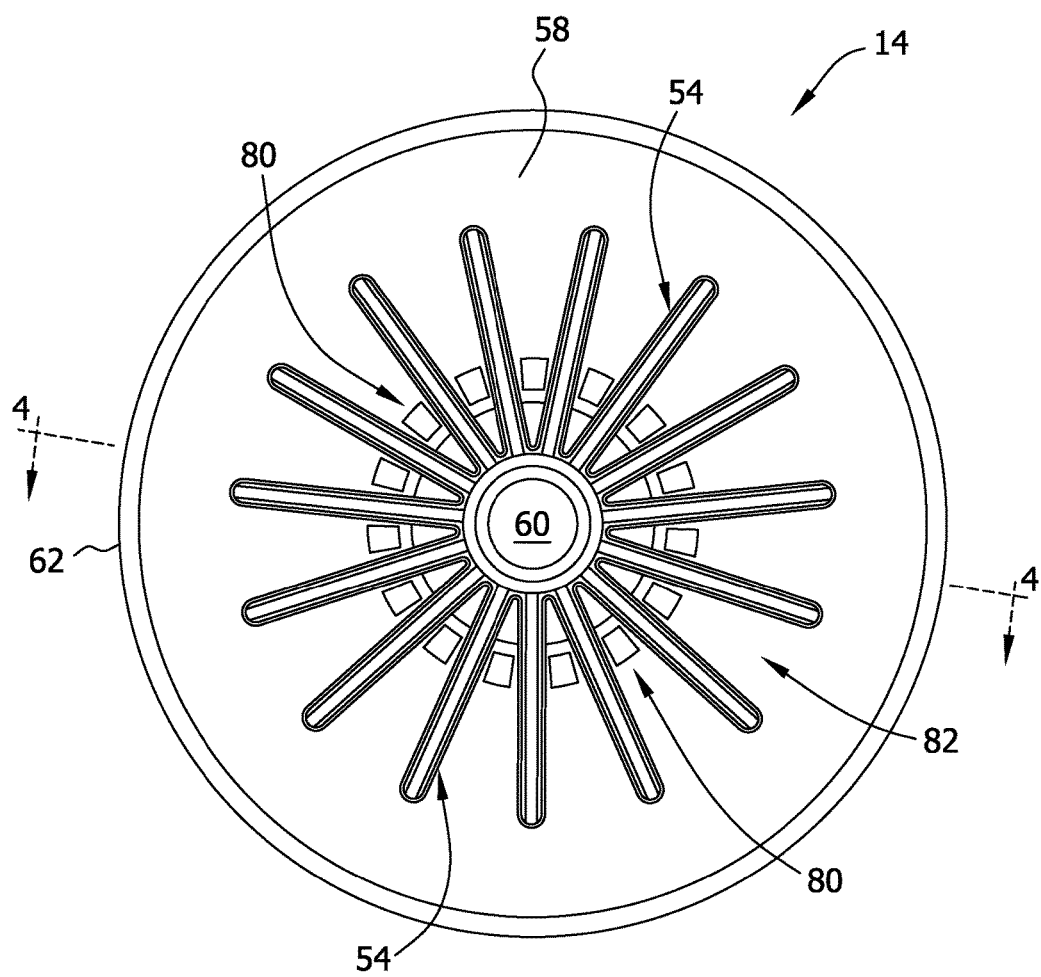
FIG. 3 is a back view of the fan shown in FIG. 2.
Figure 4:
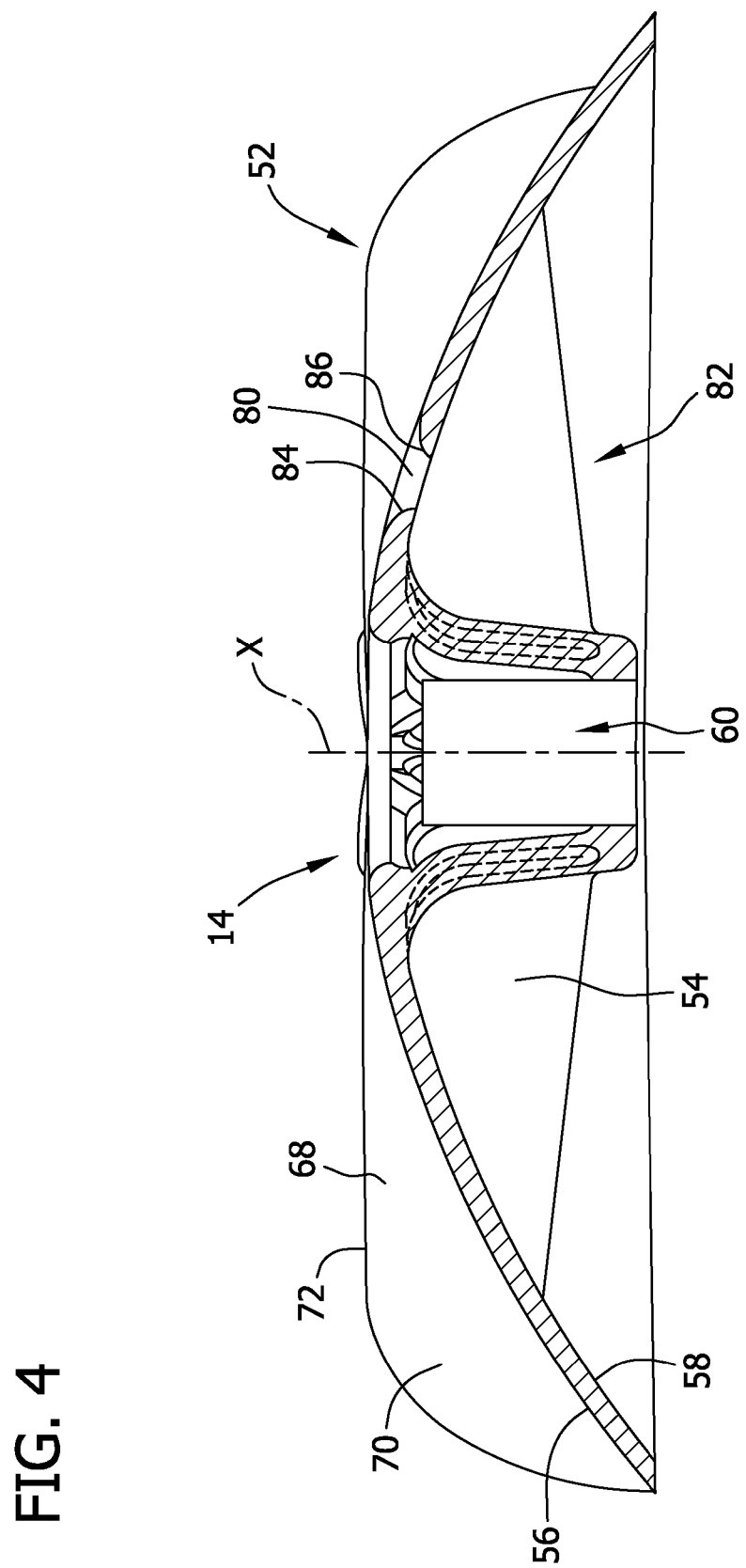
FIG. 4 is a cross-sectional view of the fan shown in FIG. 3 taken along line 4-4.

FIGS. 2-4 illustrate an exemplary embodiment of fan 14. Fan 14 includes a generally bowl-shaped base plate 50 having a hub 60, an outer rim 62, a first face 56 extending from hub 60 to outer rim 62, and an opposite second face 58 extending from hub 60 to outer rim 62. Base plate 50 further includes at least one blade 52 projecting from first face 56, and at least one rib 54 projecting from second face 58. In some embodiments, fan 14 has a plurality of circumferentially-spaced blades 52 (e.g., fifteen blades) and a plurality of circumferentially-spaced ribs 54 (e.g., fifteen ribs). In one embodiment, first face 56 is convex, and second face 58 is concave such that base plate 50 has a continuously changing degree of curvature along surface 56 (e.g., base plate 50 may be generally elliptical, generally parabolic, or generally hemispherical). In other embodiments, first face 56 and second face 58 may have any suitable contours that facilitate enabling fan 14 to function as described herein.

In the exemplary embodiment, each blade 52 is oriented substantially radially from hub 60 toward outer rim 62 and projects substantially perpendicularly from base plate 50 to a blade edge 72. In this manner, fan 14 is an axial fan that is configured for bi-directional operation. Alternatively, each blade 52 is oriented at any angle between 0° and 90° from first surface 56 of base plate 50. In the exemplary embodiment, blades 52 are substantially flat or linear. Alternatively, each blade 52 may have any curvature as blade 52 extends from base plate 50 and/or as blade 52 extends between hub 60 and rim 62 that enables fan 14 to function as described herein.

In the exemplary embodiment, blade edge 72 has a first portion 68 that extends from hub 60 at a substantially orthogonal orientation to axis of rotation X, and blade edge 72 has a second portion 70 that extends curvilinearly from first portion 68 toward outer rim 62. In one embodiment, first portion 68 of blade edge 72 is substantially perpendicular to axis X. In another embodiment, first portion 68 of blade edge 72 may have any suitable contour that facilitates enabling fan 14 to function as described herein. In one embodiment, second portion 70 of blade edge 72 is substantially elliptical. In another embodiment, second portion 70 of blade edge 72 may have any suitable contour that facilitates enabling fan 14 to function as described herein.

In the exemplary embodiment, each rib 54 is also oriented substantially radially from hub 60 toward outer rim 62 and projects substantially perpendicularly from base plate 50 such that each rib 54 is generally aligned with one respective blade 52. Alternatively, each rib 54 is oriented at any angle between 0° and 90° from second surface 58 of base plate 50. In the exemplary embodiment, ribs 54 are substantially flat or linear. Alternatively, each rib 54 may have any curvature as rib 54 extends from base plate 50 and/or as rib 54 extends between hub 60 and rim 62 that enables fan 14 to function as described herein. Furthermore, in the exemplary embodiment, each rib 54 extends radially outward from hub 60 toward rim 62. Alternatively, ribs 54 may be oriented substantially radially from hub 60, but not coupled to hub 60. In the exemplary embodiment, each rib 54 has an equal length. Alternatively, at least one rib 54 may have a different length than an adjacent rib 54.

In the exemplary embodiment, base plate 50 further includes a plurality of apertures 80, and each aperture 80 is located between a pair of adjacent blades 52 and/or a pair of adjacent ribs 54. Apertures 80 are sized to permit airflow into an interior 82 of bowl-shaped base plate 50 to facilitate cooling second end wall 22 of motor 12 (e.g., each aperture has tapered edges 84 and 86 that enable a smoother flow of air into interior 82). Apertures 80 may have any suitable size or shape that facilitates enabling fan 14 to function as described herein (e.g., apertures 80 may be sized in accordance with a desired RPM rating of fan 14). In the exemplary embodiment, fan 14 includes at least one aperture 80 between each pair of adjacent blades 52. Alternatively, fan 14 may include at least one aperture 80 between every other pair of adjacent blades 52. Furthermore, fan 14 may include a plurality of apertures 80 between at least one pair of blades 52. In the exemplary embodiment, apertures 80 are positioned proximate hub 60 on base plate 50. Alternatively, each aperture 80 may be located anywhere on base plate 50 between hub 60 and rim 62 that facilitates operation of fan 14 as described herein.

Figure 5:
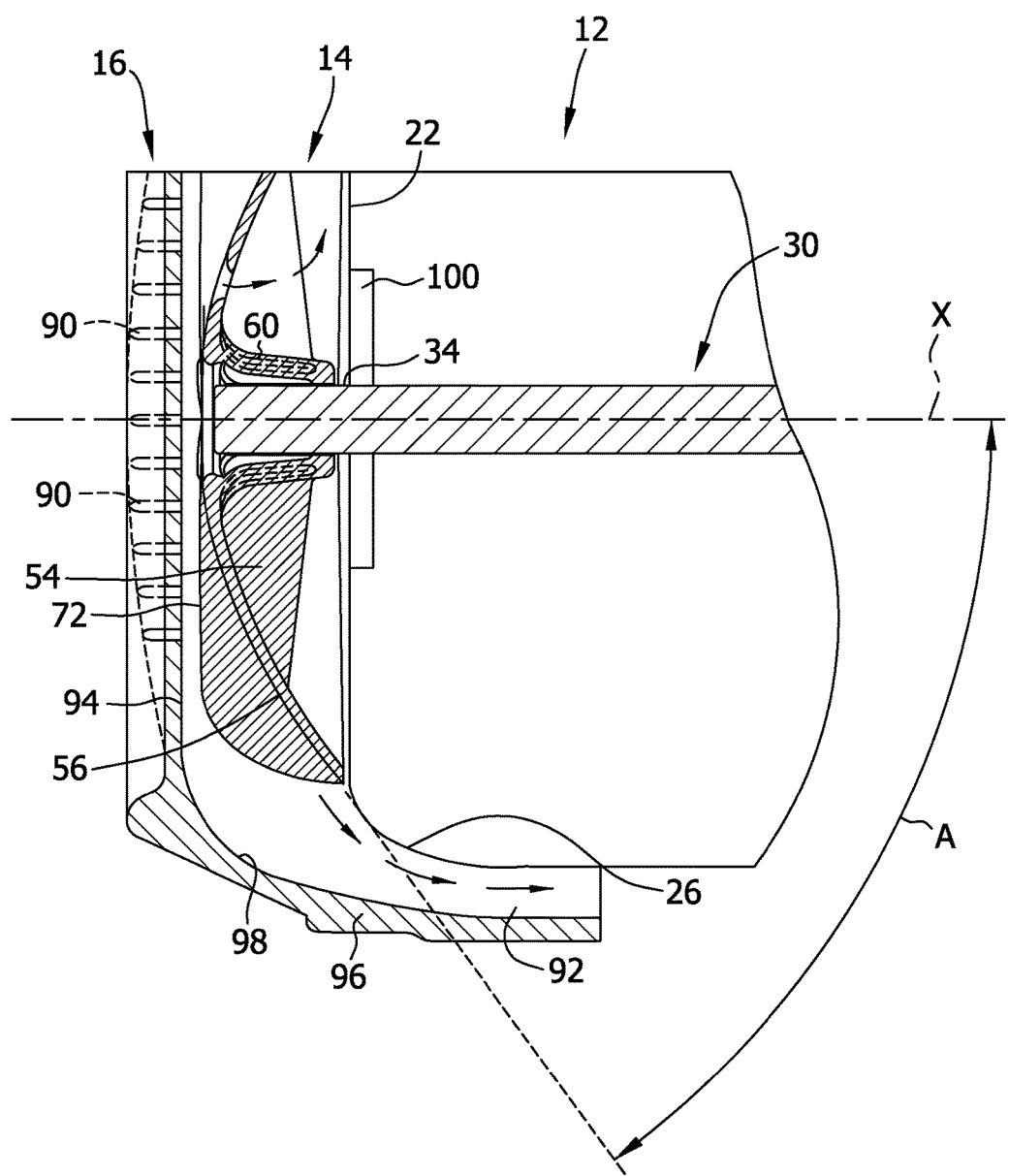
FIG. 5 is a partial cross-sectional view of the electric machine assembly shown in FIG. 1 with a shroud covering the fan.

FIG. 5 illustrates a cross-sectional view of electric machine assembly 10. In the exemplary embodiment, a generally bowl-shaped shroud 16 is coupled to housing 18 in a stationary manner such that shroud 16 is disposed over fan 14, with fan 14 rotatably disposed between shroud 16 and second end wall 22 of housing 18. Shroud 16 facilitates protection of fan 14 and increased cooling performance along housing 18. In the exemplary embodiment, shroud 16 includes a plurality of air inlets 90 that are oriented substantially parallel to axis of rotation X. Alternatively, inlets 90 may be of any size, orientation, and shape that facilitates operation of shroud 16 as described herein. Shroud 16 is sized to envelop at least a portion of second end wall 22 of housing 18 to define an annular air outlet 92 along sidewall 24 of housing 18. In one embodiment, outlet 92 is shaped to facilitate channeling a maximum amount of cooling airflow through outlet 92 and over sidewall 24. In other embodiments, outlet 92 may be shaped in any suitable manner.

In the exemplary embodiment, shroud 16 is contoured such that, when coupled to housing 18, a central segment 94 of shroud 16 is oriented substantially perpendicular to axis of rotation X, and a peripheral segment 96 of shroud 16 is substantially parallel to axis of rotation X (e.g., shroud 16 is contoured to substantially complement the contour of, or envelop, housing 18 near second end wall 22). In the exemplary embodiment, central segment 94 and peripheral segment 96 are joined together at a rounded contour 98 (e.g., a substantially elliptical contour). In other embodiments, rounded contour 98 may have any suitable contour that facilitates enabling shroud 16 to function as described herein.

In the exemplary embodiment, an electronics enclosure 100 is positioned within motor second end wall 22. Electronics enclosure 100 is configured to house various electronics, controls and/or drive system components. Electronics enclosure 100 generates heat during operation and is cooled by air flowing through apertures 80 behind fan 14. Alternatively, electronics enclosure 100 is positioned on second end wall 22 between fan 14 and second end wall 22 or anywhere on housing 18 that enables electronics enclosure 100 to be cooled by air flow.

During operation, fan 14 rotates about rotational axis X and draws air through air inlets 90 of shroud 16. The continuously changing degree of curvature of base plate 50 facilitates airflow remaining attached along the entire surface of base plate 50. Base plate 50 directs air at an acute angle A relative to rotational axis X as air passes over outer rim 62, and the air is thereafter directed axially along housing 18 through outlet 92 by shroud 16 and effects of the contours of electric machine assembly 10. Because the contour of blade outer edge 72 is substantially contiguous with, or matched to, rounded contour 26, a smoother transition of air flow from base plate 50 over sidewall 24 of housing 18 is facilitated. More specifically, attachment of airflow over rounded contour 26 is facilitated through the Coanda Effect (tendency of a fluid to be attracted to a nearby surface) since air flow departing axial fan 14 is at angle A and, therefore, attaches to (or follows more smoothly over) rounded contour 26 of housing 18. Attachment of air flow over rounded contour 26 is also facilitated through the Bernoulli Effect (an increase in flow velocity leads to a decrease in static pressure) since the acceleration and velocity of the angled air flow is increased. In this manner, fan 14 increases cooling air velocity, volume, and distance of travel over sidewall 24 of housing 18.

Additionally, ribs 54 generate an area of low pressure within interior 82 of bowl-shaped base plate 50 during rotation of fan 14 such that air flow through apertures 80 and over second end wall 22 is increased to facilitate improved cooling of electric machine assembly 10, motor 12, and/or electronics enclosure 100 near second end wall 22 and behind fan 14 (e.g., a low pressure gradient develops within the interior 82 of base plate 50 due to ribs 54, which draws air through apertures 80 due, at least in part, to the Bernoulli Effect and/or low pressure behind moving blades 52, and the air flowing through apertures 80 is provided over second end wall 22 of housing 18 and/or electronics enclosure 100 behind fan 14). The air flowing within interior 82 of base plate 50 is accelerated subsequently directed over rounded contour 26 and axially along sidewall 24 between cooling fins 28. By tapering outlet 92 toward second end of housing, air flow can be accelerated through outlet 92 to improve cooling efficiency even more.

The methods and systems described herein facilitate providing an axial fan for cooling a rotating device such as a motor. The methods and systems described herein also facilitate providing an axial fan configured to direct air flow at an acute angle A relative to an axis of rotation X of a motor shaft to which the fan is coupled, thereby increasing air flow velocity and air flow attachment over the housing of the motor. The methods and systems described herein further facilitate providing an axial fan with a base plate contoured to better complement a contour of a motor housing, thereby improving air flow speed and attachment over the sidewall of the motor housing. Additionally, the methods and systems described herein facilitate providing an axial fan that produces a flow of air behind the fan for cooling the motor housing behind the fan. The methods and systems described herein also facilitate providing a shroud over an axial fan for accelerating airflow over a side wall of a motor housing via a tapered outlet formed by the shroud, thereby improving attachment of the airflow to the motor housing along the entire length of the housing. The methods and systems described herein therefore facilitate providing an axial fan that requires less torque for a given RPM, which facilitates improving the overall air moving and cooling efficiency of the fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan for a rotating device having a shaft with an axis of rotation, said fan comprising:
    a base plate comprising a front surface, a rear surface, and a hub configured for coupling to said shaft; and
    at least one blade projecting from said front surface of said base plate substantially perpendicular thereto, said at least one blade oriented substantially perpendicular to said base plate such that said fan is configured for bi-directional operation, said at least one blade comprising a first portion, a second portion, and a blade edge extending along said first and second portions, said blade edge of said first portion extending from said hub substantially perpendicular to said rotational axis, and said blade edge of said second portion extending curvilinearly from said first portion to an outer rim of said base plate,
    wherein said base plate is contoured to direct air at an acute angle relative to said axis of rotation.

2. The fan of claim 1, further comprising at least two adjacent blades, said base plate further comprising an aperture positioned between said adjacent blades, wherein said fan is configured to direct air through said aperture.

3. The fan of claim 2, further comprising at least one rib projecting from said rear surface, said at least one rib configured to generate an area of low pressure to draw air through said aperture.

4. The fan of claim 3, wherein said at least one rib is aligned with said at least one blade.

5. The fan of claim 2, further comprising a plurality of blades and a plurality of apertures positioned radially about said central hub, each aperture of said plurality of apertures positioned between adjacent blades, wherein said fan is configured to direct air through said apertures.

6. The fan of claim 5, wherein at least one of said apertures comprises a pair of opposed tapered edges.

7. The fan of claim 1, wherein said base plate further comprises a convex front surface and a concave rear surface, said convex front surface and said concave rear surface defining a substantially bowl-shaped base plate.

8. The fan of claim 1, wherein said contour of said base plate is elliptical.

9. The fan of claim 1, wherein said at least one blade is integral with said hub.

10. The fan of claim 1, wherein said base plate further comprises an outer rim spaced radially from said hub, wherein said at least one blade extends from said hub to said outer rim.

11. The fan of claim 10 further comprising at least one rib projecting from said rear surface and extending from said hub to said outer rim, wherein said base plate further includes a plurality of apertures positioned radially about said hub, said at least one rib configured to generate an area of low pressure to draw air through said apertures.

12. An electric machine assembly comprising:
    a motor including a housing and a shaft with an axis of rotation; and
    a fan comprising:
        a base plate comprising a front surface, a rear surface, and a hub configured for coupling to said shaft; and
        a plurality of blades projecting from said front surface of said base plate substantially perpendicular to said base plate, each blade of said plurality of blades oriented substantially perpendicular to said base plate such that said fan is configured for bi-directional operation, said at least one blade comprising a first portion, a second portion, and a blade edge extending along said first and second portions, said blade edge of said first portion extending from said hub substantially perpendicular to said rotational axis, and said blade edge of said second portion extending curvilinearly from said first portion to an outer rim of said base plate,
    wherein said base plate is contoured to direct air at an acute angle relative to said axis of rotation.

13. The electric machine assembly of claim 12, wherein said base plate further includes a plurality of apertures positioned radially about said hub, each aperture of said plurality of apertures positioned between adjacent blades, wherein said fan is configured to direct air through said apertures to cool an end wall of said housing immediately behind said fan.

14. The electric machine assembly of claim 13, further comprising at least one rib projecting from said rear surface, said at least one rib configured to generate an area of low pressure to draw air through said apertures.

15. The electric machine assembly of claim 12, wherein said housing includes a sidewall connecting first and second opposed ends, said first end wall adjacent to said base plate rear surface, and said first end wall and said sidewall joined together at a rounded contour.

16. The electric machine assembly of claim 12, further comprising a shroud coupled to said housing and defining an outlet about said housing between said shroud and said housing, said shroud configured to direct air through said outlet and along said housing.

17. The electric machine assembly of claim 16, wherein said shroud further comprises a central segment oriented substantially perpendicular to said shaft and a peripheral segment substantially parallel to said shaft, said central segment and said peripheral segment joined together at a substantially rounded contour.

* * * * *